(12) United States Patent
Wilson

(10) Patent No.: US 6,603,395 B2
(45) Date of Patent: Aug. 5, 2003

(54) NO TURN WARNING APPARATUS FOR A MOTOR VEHICLE AND METHOD OF PROJECTING A NO TURN WARNING TOWARD AN ONCOMING MOTOR VEHICLE

(76) Inventor: John S. Wilson, 96 Wolf Pen Branch Rd., Annville, KY (US) 40402

( * ) Notice: Subject to any disclaimer, the term of this patent is extended or adjusted under 35 U.S.C. 154(b) by 0 days.

(21) Appl. No.: 09/897,336

(22) Filed: Jul. 3, 2001

(65) Prior Publication Data

US 2003/0006908 A1 Jan. 9, 2003

(51) Int. Cl.[7] .................................................. B60Q 1/26
(52) U.S. Cl. ........................ 340/468; 340/463; 340/464; 340/465; 340/470; 340/471; 340/472
(58) Field of Search ................................. 340/468, 463, 340/465, 470, 471, 472, 902, 906, 464

(56) References Cited

U.S. PATENT DOCUMENTS

| | | | |
|---|---|---|---|
| 2,120,288 A | | 6/1938 | McCready |
| 3,109,158 A | | 10/1963 | Coombs |
| 3,492,638 A | | 1/1970 | Lane |
| 4,550,304 A | * | 10/1985 | Saitta ........................ 340/84 |
| 5,444,620 A | | 8/1995 | Yeh |
| 5,486,808 A | | 1/1996 | Nejdl |
| 5,495,243 A | * | 2/1996 | McKenna .................. 340/902 |
| 5,515,026 A | * | 5/1996 | Ewert ........................ 340/436 |
| 5,663,707 A | | 9/1997 | Bartilucci |
| 5,782,549 A | * | 7/1998 | Glatzmeier et al. ......... 340/472 |
| 5,966,073 A | * | 10/1999 | Walton ....................... 340/479 |
| 6,195,001 B1 | | 2/2001 | Haddad et al. |

* cited by examiner

*Primary Examiner*—Daniel J. Wu
*Assistant Examiner*—Hung T Nguyen
(74) *Attorney, Agent, or Firm*—Kenneth F. Pearce

(57) ABSTRACT

An apparatus and method of projecting a no turn warning to an oncoming vehicle or pedestrian. The no turn warning indicates the motor vehicle is proceeding in a straight pathway through an intersection rather than turning either to the left or to the right. At least one visible light is mounted to the frontal exterior of the motor vehicle for projecting the no turn warning. When more than one visible light is mounted to the frontal exterior of the motor vehicle, the no turn signal can flash serial, sequentially or concurrently, in accordance with the controller's preprogrammed paradigm.

20 Claims, 7 Drawing Sheets

FIG 8

Medially mounting the first visible light about the forward member, wherein the forward member is located between the bumper and the hood

Establishing other locations about either the bumper, the hood, the windshield, the span or the rearview mirror for the mounting of other visible lights

Mounting the second visible light at a location different from the first visible light

Programming a controller, according to a predetermined paradigm and linking the controller to the visible lights, to energize the flashing no turn warning

Engaging a switch in the operator's compartment coupled to the controller to activate the controller such that the no turn warning is projected toward an oncoming person

Indicating to an occupant of the operator's compartment the no turn warning is flashing

FIG 9

Medially mounting the first visible light about the forward member, wherein the forward member is located between the bumper and the hood

Establishing other locations about either the bumper, the hood, the windshield, the span or the rearview mirror for the mounting of other visible lights

Mounting the second visible light at a location different from the first visible light

Mounting the third visible light at a location different from the first and second visible lights

Programming a controller, according to a predetermined paradigm and linking the controller to the visible lights, to energize the flashing no turn warning

Engaging a switch in the operator's compartment coupled to the controller to activate the controller such that the no turn warning is projected toward an oncoming person

Indicating to an occupant of the operator's compartment the no turn warning is flashing

FIG 12

Medially mounting the first visible light about the forward member, wherein the forward member is located between the bumper and the hood

↓

Establishing other locations about either the bumper, the hood, the windshield, the span or the rearview mirror for the mounting of other visible lights

↓

Mounting the second visible light at a location different from the first visible light

↓

Mounting the third visible light at a location different from the first and second visible lights

↓

Programming a controller, according to a predetermined paradigm and linking the controller to the visible lights, to energize sequentially the flashing no turn warning

↓

Engaging a switch in the operator's compartment coupled to the controller to activate the controller such that the no turn warning is projected toward an oncoming person

↓

Indicating to an occupant of the operator's compartment the no turn warning is flashing

FIG 13

Medially mounting the first visible light about the forward member, wherein the forward member is located between the bumper and the hood

↓

Establishing other locations about either the bumper, the hood, the windshield, the span or the rearview mirror for the mounting of other visible lights

↓

Mounting the second visible light at a location different from the first visible light

↓

Mounting the third visible light at a location different from the first and second visible lights

↓

Programming a controller, according to a predetermined paradigm and linking the controller to the visible lights, to energize concurrently the flashing no turn warning

↓

Engaging a switch in the operator's compartment coupled to the controller to activate the controller such that the no turn warning is projected toward an oncoming person

↓

Indicating to an occupant of the operator's compartment the no turn warning is flashing

FIG 14

Medially mounting the first visible light about the forward member, wherein the forward member is located between the bumper and the hood

↓

Establishing other locations about either the bumper, the hood, the windshield, the span or the rearview mirror for the mounting of other visible lights

↓

Mounting the second visible light at a location different from the first visible light

↓

Mounting the third visible light at a location different from the first and second visible lights

↓

Programming a controller, according to a predetermined paradigm and linking the controller to the visible lights, to energize at least one of the visible lights beam a predefined pattern of the flashing no turn warning

↓

Engaging a switch in the operator's compartment coupled to the controller to activate the controller such that the no turn warning is projected toward an oncoming person

↓

Indicating to an occupant of the operator's compartment the no turn warning is flashing

NO TURN WARNING APPARATUS FOR A MOTOR VEHICLE AND METHOD OF PROJECTING A NO TURN WARNING TOWARD AN ONCOMING MOTOR VEHICLE

BACKGROUND OF THE INVENTION

1. Field of the Invention

A device and method for projecting a no turn warning from the front of an advancing motor vehicle toward an oncoming person. One embodiment of the present invention is particularly useful on emergency motor vehicles, such as, ambulances, fire trucks, law enforcement vehicles, police cruisers, as well as other types of emergency motor vehicles. Another embodiment is incorporated into more traditional motor vehicles, such as, automobiles or trucks. At least one light is located at the frontal exterior preselected position of the motor vehicle. When activated in accordance with the present method, the apparatus projects a flashing no turn warning signal toward oncoming pedestrians or vehicles. The no turn warning indicates the motor vehicle is proceeding in a straight pathway through an intersection rather than turning either to the left or to the right. In select embodiments, more than one light is mounted to the frontal exterior of the motor vehicle. Bulbs, laser or fiber optics can be utilized to project the flashing no turn warning. White as well as other visible lights can be incorporated into the practice of the present invention.

1. Description of the Previous Art a) U.S. Pat. No. 2,230,288-McCready enables forward and aft directional indicating devices for a motor vehicle. Unless manually overridden, the McCready devices automatically reveal the direction in which the motor vehicle is traveling. McCready's forward device is generally mounted upon the radiator cap and uses a combination of red and green signal lights. The rearward device incorporates the red and green lights of the forward device as well as an amber caution light and a red taillight. The '288 invention projects the red and green light in arrow-like shape to show the direction of the motor vehicle.

While running straight ahead, only McCready's green arrows are illuminated, but the driver can use the manual switch to indicate the direction of the proposed turned. McCready uses red arrows to indicate the direction of an upcoming turn, but when the manual switch is first engaged, the straight ahead green arrows remain illuminated and the reward warning signal remains dark. When the turn actually begins, the red direction arrows are extinguished for an instant, then the warning signal comes on followed by the arrow again. This sequence, together with the extinguishing of the green straight ahead signals that a turn is to be made. The rocking of the automatic switch during the turn automatically swings the manual switch back to its inoperative position.

Under an automatic application of the '288 invention, engaging the foot brake, without turning, lights the rearward warning signal and causes the green arrows to darken in color. When the operator turns the steering wheel, the rearward amber warning signal and the appropriate red arrow are illuminated while the green arrow is extinguished. The straightening of the wheel extinguishes the red direction arrows and warning signal and re-lights the green arrows indicating forward movement of the motor vehicle.

b) U.S. Pat. No. 3,109,158-Combs discloses a visual indicator positioned at the rear of the motor vehicle. Oil-pressure dependent circuitry supports the indicator's operation. The Combs visual indicator signals any change in operational conditions of the motor, accelerator, brakes, reverse gear and oil pump to the driver following the Combs vehicle. The '158 invention also enables multicolored visual indicator panels, yellow for caution, green for go, red for stopping. Combs also teaches the use of flashing yellow panel, when the Combs vehicle is stationary and the gear shift is in any position other than reverse.

c) U.S. Pat. No. 3,492,638-Lane teaches a readily viewable rearwardly situated signal system that automatically indicates the change of speed in the vehicle. Near the apex of the '638 station wagon's roof, the Lane apparatus incorporates a series of red and green lights of varying dimensions. These different sized lamps reveal the status of the vehicle's movement. Using connections with the intake manifold and brake master cylinder, the '638 system electromechanically correlates whether the vehicle is idling, braking, cruising, accelerating, etcetera.

d) U.S. Pat. No. 5,444,620-Yeh discloses an apparatus for indicating the driving status of the forward vehicle to the trailing vehicle. Specifically, the Yeh device indicates if the driver of the forward vehicle is stepping on or releasing the accelerator pedal, or stepping on the brake pedal. As described, the Yeh apparatus is disposed inside the passenger compartment and facing reward, and it incorporates three different colored lights, e.g., green to indicate the driver has engaged the accelerator, red to show the driver has engaged the brake pedal, and yellow to indicate the driver has neither engaged the accelerator or the brake pedal. The '620 invention enables a system including two relays and two contacts. Responsive to whether the brake, accelerator or neither of those pedals has been depressed, the combination of the relays and contacts coordinate which color light is emitted toward the rearward vehicle.

e) U.S. Pat. No. 5,486,808-Nejdl enables an external cruise control warning light. The Nejdl warning light is mounted on the back deck of the passenger compartment so that it can be clearly seen by persons behind the vehicle. The '808 device projects rearwardly such words as "on cruise," "cruise on," "speed set" or "set speed." Nejdl also teaches that a light emitting diode embodiment can be substituted for his light bulb embodiment.

f) U.S. Pat. No. 5,663,707-Bartilucci relates to a signaling light visible through the rear window of the vehicle that signals the lead driver's intent in a rearward direction to the following driver. The '707 invention includes arrays of green, red and yellow light emitting diodes. Switches coupled to the accelerator, brake pedal, transmission and turn signal lever are linked to Bartilucci's logic circuit to control the rearwardly projecting various colored light emitting diodes.

g) U.S. Pat. No. 6,195,001 B1-Haddad, et. al., enables the U-turn signal secured to the interior of the motor vehicle that emits its signal rearwardly. The driver of the motor vehicle utilizes radio frequency transmission to active the '001 device. Upon activation, the Haddad apparatus will flash the inverted U signal rearwardly for a predetermined time to indicate to following drivers that the lead driver intends to make a U-turn.

SUMMARY OF THE INVENTION

Due to ever-increasing traffic volume, in recent years, there has been greater congestion at intersections. Of course, more congestion also results in greater uncertainty for those persons approaching the intersection. And greater confusion of the driving public coupled with the proliferation of right-turn-on-red laws, in many places, has created a need for a no turn warning for motor vehicles. The present apparatus and method provide a way for meeting this need and indicating the motor vehicle is proceeding straight through the intersection rather than turning to the right or to the left.

In operation, the apparatus is mounted to the frontal exterior of either an emergency motor vehicle or a traditional motor vehicle, such as, an automobile or truck. The invention includes at least one light, a mounting, a circuit, power supply, a controller and a switch located in the operator's compartment. In accordance with the present invention, lights can be mounted about any, all or some of the preselected positions. The bumper or bumper pad, the hood, the windshield, the span, the forward member and/or the operator's compartment's rearview mirror can define the preselected positions. Within the scope of the present invention, the no turn warning projected toward the oncoming person can be of any preselected color. For example, red, for fire trucks, or blue and red, for police cruisers. At the same time, it has unexpectedly been determined that amongst the plethora of usable visible light colors, flashing visible white light frequently attracts the attention of the oncoming person. Laser, fiber optics or bulbs, or combinations thereof, can be used to project the no turn warning.

An object of the present invention is to provide a warning to an oncoming person that the emergency motor vehicle is proceeding straight through an intersection rather turning to the left or right.

It is another object of the present invention to enable the warning of an oncoming person that the automobile or truck is proceeding straight through an intersection rather turning to the left or right.

Still another object of the present invention is to flashingly project the no turn warning from the frontal exterior of the motor vehicle toward the oncoming person.

Yet another object of the present invention is to provide a no turn warning activated by an occupant of the operator's compartment.

Still another object of the present invention is to provide preselected positions for mounting the no turn warning.

Yet still another object of the present invention is to project the no turn warning in the shape of an arrow toward the oncoming person.

It is yet another object of the present invention to provide an apparatus and method for projecting the no turn warning according to a predetermined paradigm.

Still another object of the present invention is to enable an invention incorporating either bulbs, lasers, fiber optics, or other devices known in the art to project light to flash the no turn warning.

Yet still another object of the present invention is to disclose a method describing the flashing of an no turn warning from a motor vehicle toward an oncoming person.

It is yet another object of the present invention to provide a method projecting the no turn warning to attract the attention of oncoming persons, regardless of whether the oncoming persons are operating other vehicles or are pedestrians.

An embodiment of the present invention can be described as a no turn indicator apparatus comprising: a frontal exterior of the emergency motor vehicle that also includes a bumper, a hood, a windshield, a span, a forward member and a first visible light such that upon illumination the no turn warning is projected toward the oncoming person; an operator's compartment situated behind the frontal exterior of the emergency motor vehicle having a switch for the controller for energizing the no turn warning; a circuit coupled to the controller and the first visible light; and a power supply for supplying energy to the turn warning.

Another embodiment of the present invention can be described as a no turn indicator apparatus comprising: a frontal exterior of the motor vehicle that also includes a bumper, a hood, a windshield a span, a forward member and a first visible light such that upon illumination the no turn warning is projected toward the oncoming person; an operator's compartment situated behind the frontal exterior of the motor vehicle having a rearview mirror and a switch for the controller for energizing the no turn warning; a circuit coupled to the controller and the first visible light; and a power supply for supplying energy to the turn warning.

Yet another embodiment of the present invention can be described as a method of flashing a no turn warning from a motor vehicle toward an oncoming person, comprising the steps of: medially mounting the first visible light about a forward member of the motor vehicle for projecting the no turn warning; establishing other locations about the motor vehicle for mounting other visible lights; mounting a second visible light at one of the other locations; programming a controller linked to the visible lights to energize the flashing no turn warning, according to a predetermined paradigm; engaging a switch in an operator's compartment of the vehicle for activating the controller such that the flashing no turn warning is projected toward the oncoming person; and evidencing inside the operator's compartment the flashing of the no turn warning to an occupant of the operator's compartment.

It is the novel and unique interaction of these simple elements which creates the devices and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

In accordance with the present invention.

FIG. 8 is a depiction of the steps of an embodiment of the present invention.

FIG. 9 is an exemplification of the steps of yet another embodiment of the current method.

FIG. 12 is an exemplification of the steps of yet another embodiment of the current method.

FIG. 13 is a depiction of the steps of yet another embodiment of the present invention.

FIG. 14 is a diagrammatic representation of the steps of still another embodiment of the present method.

DESCRIPTION OF THE PREFERRED EMBODIMENTS

Although the disclosure hereof is detailed to enable those skilled in the art to practice the invention, the embodiments published herein merely exemplify the present invention.

Figure 1:
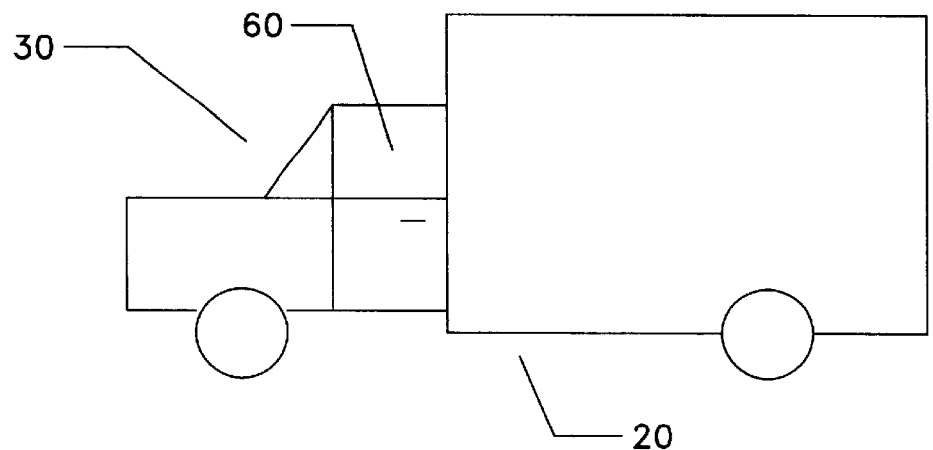
FIG. 1 is a side view of an emergency motor vehicle.
Figure 2:
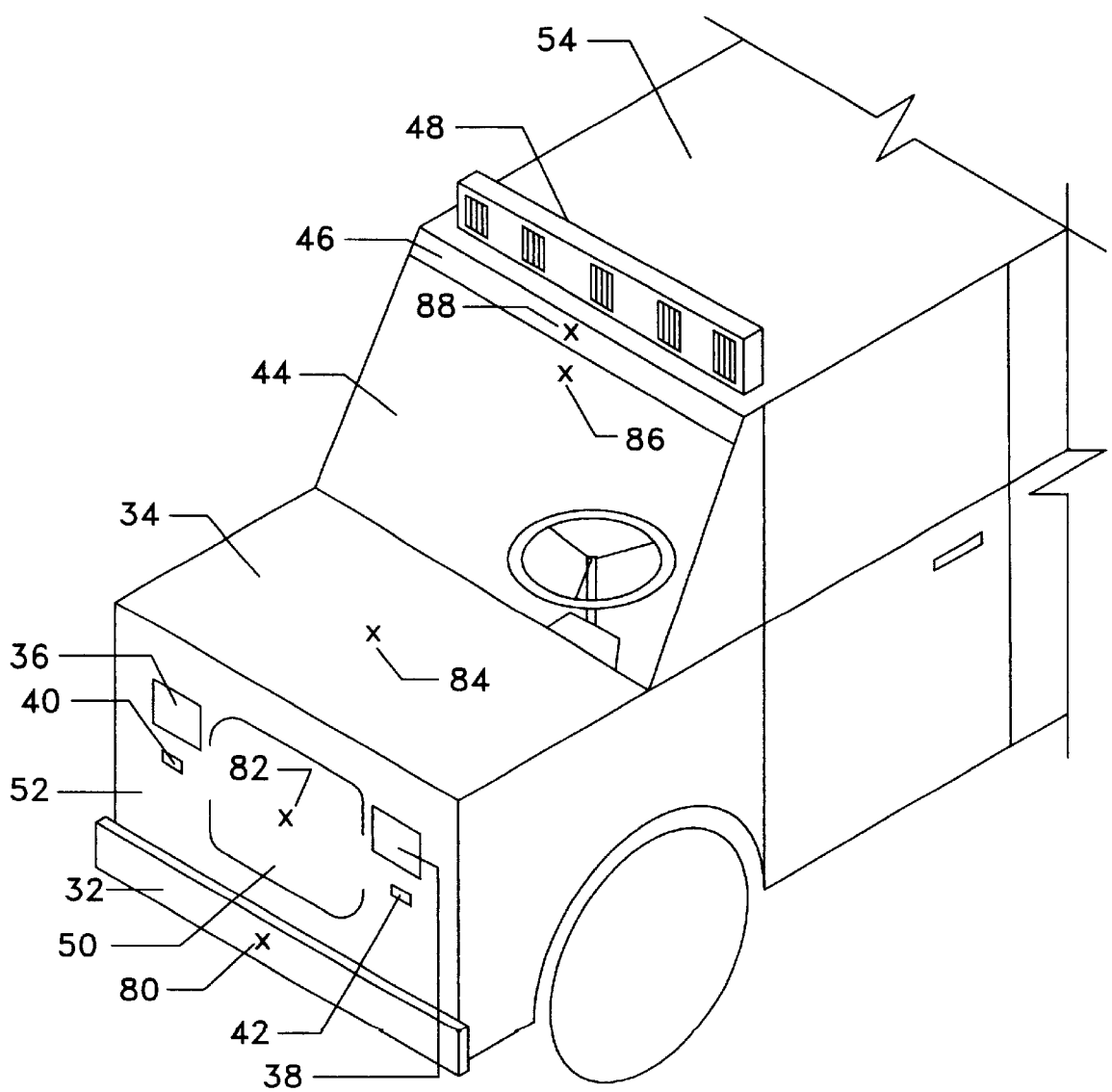
FIG. 2 is a frontal representation of an emergency motor vehicle including the present invention.

FIG. 1 is represents an emergency motor vehicle (20) having frontal exterior (30) and operator's compartment (60) while FIG. 2 is frontal close up perspective view of frontal exterior (30) of emergency motor vehicle (20).

With reference to FIGS. 1 and 2, emergency flashing lights (48) are mounted atop roof (54). Emergency flashing lights (48) are those customarily mounted to fire trucks, ambulances, law enforcement vehicles, police cruisers, or other types of emergency motor vehicle. Span (46), which may be load bearing, traverses above windshield (44) that is disposed between hood (34) and roof (54). Hood (34) extends forwardly from operator's compartment (60) to face (52) of frontal exterior (30) of emergency motor vehicle (20). Attached to lower edge of face (52) is bumper or bumper pad (32). Face (52) is further provided with standard headlights (36) and (38) and standard turn signal lights (40) and (42) which define frontal member (50) that is interposed between headlights (36) and (38).

In the specific embodiment shown in FIG. 2, preselected positions (80), (82), (84), (86) and (88) are medially and linearly disposed along frontal exterior (30). However, those skilled in the art recognize that preselected positions (80), (82), (84), (86) and (88) can also be nonlinearly disbursed about frontal exterior (30) of emergency motor vehicle (20). In accordance with the present invention, bulbs, fiber optics or lasers, as well as, any combination thereof can supply the source of the flashing light no turn warning. Depending upon the embodiment selected to be mounted to emergency motor vehicle (20) and user preference of color and type of visible light to be utilized, a single or more than one visible light can be mounted at any, some or all of preselected positions (80), (82), (84), (86) and (88).

With a view still toward FIG. 2 and by way of illustration, a single bulb could be mounted at preselected positions (80), (82) and (88). In another embodiment, a single bulb could be mounted at preselected positions (80) and (86) while a set of bulbs is mounted to preselected position (82). In still another embodiment, lasers could be mounted at preselected positions (82) and (86). Yet another embodiment could included a laser mounted at preselected position (80) and fiber optics mounted at preselected positions (82) and (88). In another embodiment, a set of lights could be mounted at preselected positions (80), (82), (84), (86) and (88). In short, the present invention includes any combination of visible lights mounted at any, some or all of the preselected positions.

Figure 3:
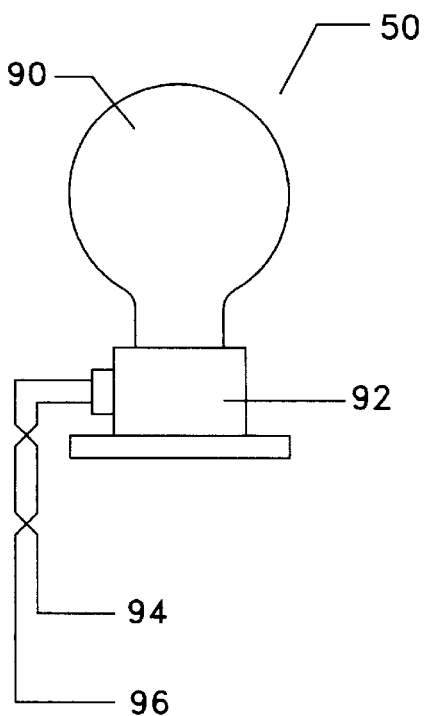
FIG. 3 is perspective of a bulb embodiment of the present invention.

FIG. 3 portrays a close up of frontal member (50) incorporating light bulb (90) and socket (92). Leads (94) and (96) are coupled to socket (92) and run to a controller (not shown). Socket (92) is mounted to frontal member (50) by any means acceptable in the art, such as, adhesive or mechanical attachers. Depending upon user preference, more than one socket (92) can be mounted at any, some or all of preselected positions (80), (82), (84), (86) and (88). And although visible white light is the preferred embodiment, other colors of light, including but not limited to, green, red, yellow, amber or blue can also be utilized at any, some or all of preselected positions (80), (82), (84), (86) and (88).

Figure 4:
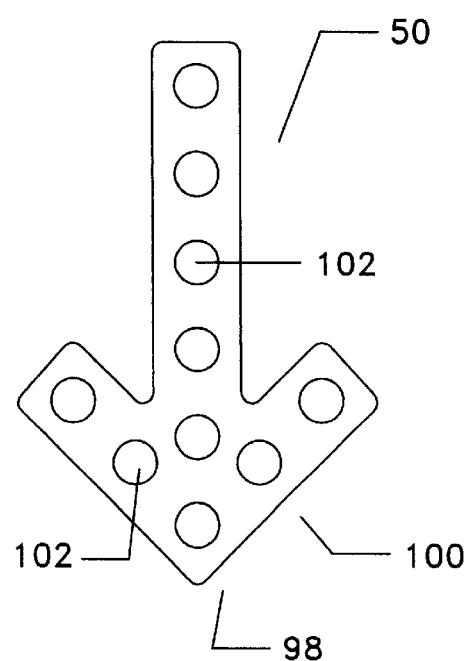
FIG. 4 is a depiction of an arrow-like embodiment of the no turn warning.

With a view toward FIG. 4, in another embodiment of the present invention, mount (98) is supplied with an array (100) of bulbs (102). In this particular embodiment, array (100) is arrow-like in configuration. However, those skilled in the art understand array (100) can be designed to any preselected configuration. Although not shown in FIG. 4, array (100) and mount (98) are linked via appropriate circuitry to a controller. As with the single bulb embodiment, more than one array (100) or color of light can be configured at any, some or all of preselected positions (80), (82), (84), (86) and (88) and thereafter linked via the necessary circuitry (not shown) to controller (not shown). Importantly, array (100) can be energized to flash serially, sequentially or concurrently. Therefore, dependent upon the predetermined paradigm, an oncoming person can see different displays of paradigm-dependent warnings projected from array (100). In a similar vein and returning momentarily to FIGS. 2 and 3, any, some or all of preselected positions (80), (82), (84), (86) and (88) can be equipped with bulb (90), socket (92) and leads (94) and (96) coupled to a controller (not shown). In accordance with another embodiment and according to the predetermined paradigm, when more than one preselected position includes a bulb, the resultant no turn warning can flash serially, sequentially or concurrently. However, those skilled in the art comprehend that any, some or all preselected positions can flash a no turn warning independent from other preselected positions.

Figure 5:
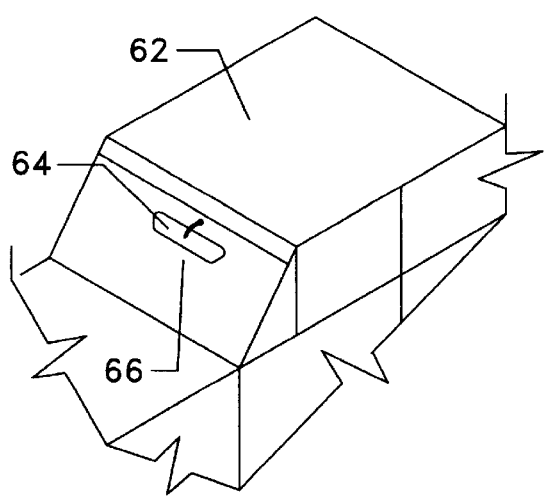
FIG. 5 is frontal perspective of a traditional motor vehicle including the rearview mirror preselected position in accordance with the present invention.

FIG. 5 depicts the exterior of a traditional motor vehicle, i.e., a motor vehicle other an emergency motor vehicle that includes but is not limited to automobiles and trucks. With the exception of the inclusion of rearview mirror (64) and the exclusion of emergency flashing lights (48), the external appearance of traditional motor vehicle's passenger compartment (62) is very similar to the external appearance of emergency motor vehicle's passenger compartment (60). Rearview mirror (64) provides another preselected position (66) for mounting a flashing no turn warning. As with other embodiments of the present invention, the no turn warning projected from preselected position (66) can also be configured to flash serially, sequentially or simultaneously with the previously identified preselected positions (80), (82), (84), (86) and (88). Additionally, preselected position (66) can project a no turn warning independent of the other preselected positions (80), (82), (84), (86) and (88).

Figure 6:
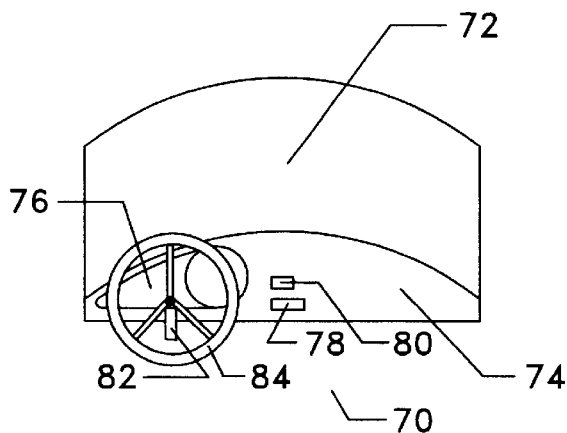
FIG. 6 is a further continuation of the above identified reasoning criterion.

FIG. 6 portrays the inside passenger compartment (70) of either an emergency motor vehicle, an automobile or a truck. Situated beneath windshield (72) is dashboard (74). Standard motor vehicle display (76) positioned on dashboard (74) includes such features as the speedometer, odometer, gas gauge, etc. In this particular embodiment, switch (78) for activating controller (not shown) and indicator (80) that reveals that no turn warning has been activated are also located on dashboard (74). Those skilled in the art understand that switch (78) can be placed at other locations, such as, steering column (82) or steering wheel (84). Additionally, switch (78) is any state-of-the-art design that will activate controller (not shown). Moreover, in select embodiments, indicator (80) can also be incorporated as a feature of standard motor vehicle display (76).

Examples of components that can be incorporated in the present invention include:

1) Radio Shack No. 272-801/802 capacitors;
2) Radio Shack No. 271-306 resistors;
3) Radio Shack No. 276-1590 circuit board;
4) Radio Shack No. 276-1718 555 timers;
5) Radio Shack No. 276-1998A sockets;
6) Radio Shack No. 275-1547 momentary switch;
7) Radio Shack No. 276-1728 556 dual timer;
8) Radio Shack No. 271-1728 potentiometer; and
9) Radio Shack No. 276-1020 silicon controlled rectifier.

Figure 7:
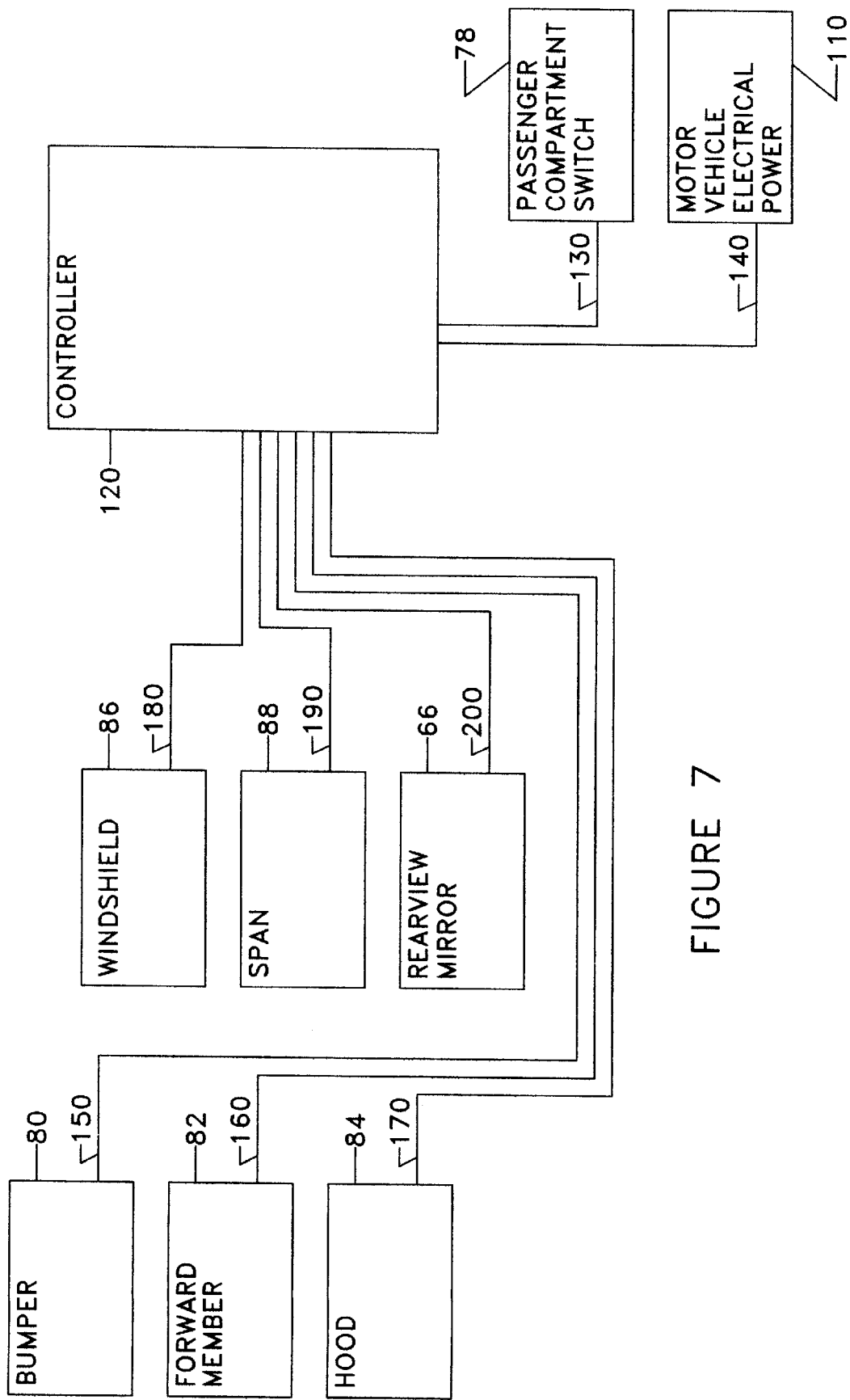
FIG. 7 is a schematic illustration of an arrangement of circuitry, within the scope of the present invention.
Figure 10:
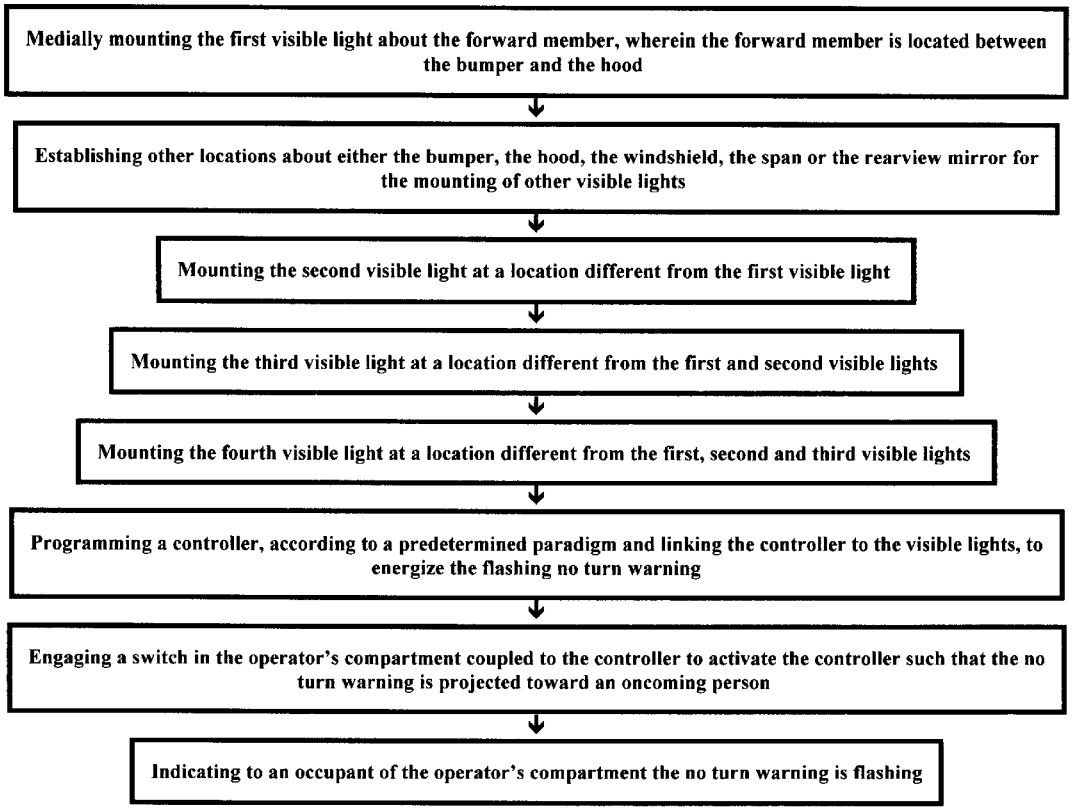
FIG. 10 is a diagrammatic representation of the steps of still another embodiment of the present invention.
Figure 11:
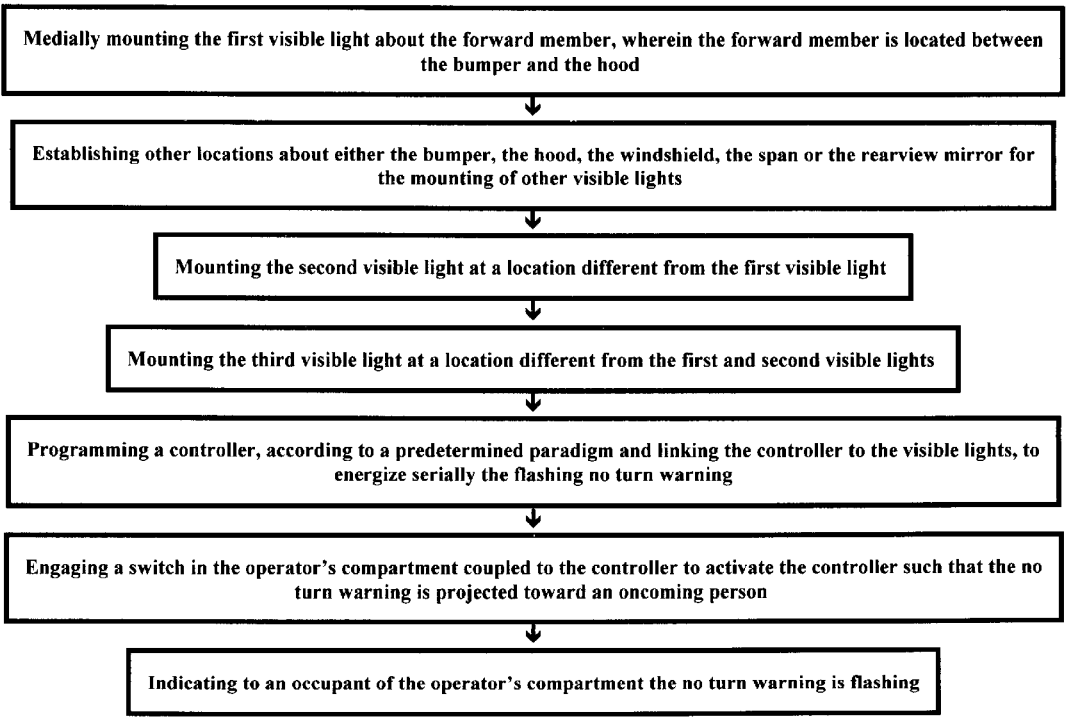
FIG. 11 is a schema of the steps of yet still another embodiment of the present method.

Turning now to FIG. 7, a schematic of the present invention is disclosed. Via circuit (140) power supply is coupled to controller (120), and controller (120) is further linked to switch (78) by circuit (130). Controller (120) can be located, under the hood, or at any other mountable location of the motor vehicle. Power supply (110) is standard issue for the motor vehicle, i.e., the battery, alternator, accompanying circuitry, etc.

Controller (120) can be a computer chip or microprocessor. Prior to utilization of the present invention, controller (120) is programmed to control the projected flashing of the no turn warning from each preselected positioned that has been supplied with visible light, in accordance with the present invention. By way of illustration, in one embodiment of the present invention, controller (120) is programmed to cause visible light mounted at preselected position (84) to flash. In another exemplary embodiment, controller (120) causes visible light mounted at preselected positions (80), (82) and (88) to flash concurrently. In yet another instructive embodiment of the present invention, controller (120) causes visible mounted at preselected positions (80), (82), (84), (86), (88) and (66) to flash serially, then sequentially for a preselected time, then concurrently for a preselected time, then sequentially, serially, so forth an so on. In short, controller (120) can be programmed to cause the no turn warning to flash in accordance with the programmer's preference. Returning to FIG. 7, circuit (150) links preselected position (80) to controller (120); circuit (160) couples preselected position (82) to controller (120); circuit (170) couples preselected position (84) to controller (120); circuit (180) links preselected position (86) to controller (120); circuit (190) links preselected position (88) to controller (120); and circuit (200) couples preselected position (66) to controller (120).

With attention directed toward FIGS. 8–14, steps of the method utilizing the apparatus of the present invention are set forth.

Having disclosed the invention as required by Title 35 of the United States Code, Applicant now prays respectfully that Letters Patent be granted for his invention in accordance with the scope of the claims appended hereto.

What is claimed is:

1. In combination with an emergency motor vehicle, a no turn indicator apparatus for projecting a no turn warning toward an oncoming person, comprising:
   a) a frontal exterior of said emergency motor vehicle, wherein said frontal exterior further comprises:
      i) a bumper including a first preselected position for mounting said no turn warning;
      ii) a hood including a second preselected position for mounting said no turn warning;
      iii) a first headlight and a second headlight positioned above said bumper;
      iv) a first turn signal proximate to said first headlight positioned at a first location of said frontal exterior; said first location for said first no turn signal positioned beneath an apex of said hood;
      v) a second turn signal proximate to said second headlight positioned at a second location of said frontal exterior;
      vi) a windshield including a third preselected position for mounting said no turn warning;
      vii) a span above said windshield including a fourth preselected position for mounting said no turn warning; and
      viii) a forward member located between said bumper, said hood, said first headlight and said second headlight including a fifth preselected position for mounting said no turn warning;
   b) a first visible light mounted about either said first, said second, said third, said fourth or said fifth preselected position such that upon illumination said first visible light projects said no turn warning to said oncoming person;
   c) an operator's compartment situated behind said frontal exterior of said emergency motor vehicle further including:
      i) a switch for activating a controller for energizing said no turn warning; and
      ii) an indicator for evidencing activation of said no turn warning;
   d) a first circuit coupled to said controller and said first visible light; and
   e) a power source for supplying energy to said no turn warning, wherein, upon engagement of said switch, said first visible light flashingly projects said no turn warning toward said oncoming person such that said no turning warning is projected forward from said emergency motor vehicle warning said oncoming person that said emergency motor vehicle is traveling through an intersection rather than turning to the right or to the left.

2. The apparatus of claim 1 further comprising a second visible light mounted about one of said preselected positions having no visible light previously mounted thereon and coupled to a second circuit linked to said controller, wherein said controller orders illumination of said first and said second visible lights to flashingly project said no turn warning toward said oncoming person.

3. The apparatus of claim 2 further comprising a third visible light mounted about one of said preselected positions having no visible light previously mounted thereon and coupled to a third circuit linked to said controller, wherein said controller orders illumination of said first, said second and said third visible lights to flashingly project said no turn warning toward said oncoming person.

4. The apparatus of claim 3, wherein said first visible light is arranged to project said no turn warning as a first flashing arrow.

5. The invention of claim 1 wherein a light bulb beams said first visible light.

6. The invention of claim 4 wherein a laser beams said first visible light.

7. The invention of claim 4 wherein fiber optics beam said first visible light.

8. In combination with a motor vehicle, a no turn indicator apparatus for projecting a no turn warning toward an oncoming person, comprising:
   a) a frontal exterior of said motor vehicle, wherein said frontal exterior further comprises:
      i) a bumper including a first preselected position for mounting said no turn warning;
      ii) a hood including a second preselected position for mounting said no turn warning;
      iii) a first headlight and a second headlight positioned above said bumper;
      iv) a first turn signal proximate to said first headlight positioned at a first location of said frontal exterior; said first location for said first no turn signal positioned beneath an apex of said hood;

v) a second turn signal proximate to said second headlight positioned at a second location of said frontal exterior;

vi) a windshield including a third preselected position for mounting said no turn warning;

vii) a span above said windshield including a fourth preselected position for mounting said no turn warning; and viii) a forward member located above said bumper, below an apex of said hood, and between said first headlight positioned below said apex of said hood and said second headlight, wherein said forward member includes a fifth preselected position for mounting said no turn warning;

b) an operator's compartment situated behind said frontal exterior of said motor vehicle further including:

i) a switch for activating a controller for energizing said no turn warning;

ii) an indicator for evidencing activation of said no turn warning; and iii) a rearview mirror providing a sixth preselected position for mounting said no turn warning;

c) a first visible light mounted about either said first, said second, said third, said fourth, said fifth or said sixth preselected position;

d) a first circuit coupled to said controller and said first visible light;

e) a second visible light mounted about either said first, said second, said third, said fourth, said fifth or said sixth preselected position not already having said first visible light mounted thereon;

f) a second circuit coupled to said controller and said second visible light;

g) a third visible light aligned with said first visible light and said second visible light and mounted about either said first, said second, said third, said fourth, said fifth or said sixth preselected position not already having said first visible light or said second visible light mounted thereon;

h) a third circuit coupled to said controller and said third visible light; and i) a power source for supplying energy to said no turn warning, wherein, upon engagement of said switch, said controller orders said first visible light, said second visible light and said third visible light to flashingly project said no turn warning toward said oncoming person such that said no turning warning is projected forward from said motor vehicle warning said oncoming person that said motor vehicle is traveling through an intersection rather than turning to the right or to the left.

9. The apparatus of claim 8 further comprising a fourth visible light mounted about one of said preselected positions having no visible light previously mounted thereon and coupled to a fourth circuit linked to said controller, wherein said controller serially orders illumination of said first, said second, said third and said fourth visible lights to flashingly project said no turn warning toward said oncoming person.

10. The apparatus of claim 8 further comprising a fourth visible light mounted about one of said preselected positions having no visible light previously mounted thereon and coupled to a fourth circuit linked to said controller, wherein said controller sequentially orders illumination of said first, said second, said third, and said fourth visible lights to flashingly project said no turn warning toward said oncoming person.

11. The apparatus of claim 8, wherein said first visible light is arrayed to project said no turn warning as a flashing arrow.

12. The apparatus of claim 11 further comprising a fourth visible light mounted about one of said preselected positions having no visible light previously mounted thereon and coupled to a fourth circuit linked to said controller, wherein said controller concurrently orders illumination of said first, said second, said third, and said fourth visible lights to flashingly project said no turn warning toward said oncoming person.

13. The invention of claim 11 wherein a laser beams said first visible light.

14. The invention of claim 11 wherein fiber optics beam said first visible light.

15. The method of flashing a no turn warning, from a motor vehicle approaching an intersection, at an oncoming person, comprising the steps of:

a) medially mounting a first visible light on a forward member of said motor vehicle for projecting said no turn warning forward from said motor vehicle and toward said oncoming person, wherein said forward member is located above a bumper, below said apex of a hood of said motor vehicle and between a first headlight and its corresponding turn signal and a second headlight and its corresponding turn signal;

b) establishing other locations about either said bumper, said hood, a windshield, a span or a rearview mirror of said motor vehicle for mounting other visible lights, wherein said other locations are aligned with said first visible light;

c) mounting a second visible light at one of said other locations for projecting said no turn warning forward from said motor vehicle and toward said on coming person;

d) programming a controller linked to said visible lights to energize said flashing no turn warning, according to a predetermined paradigm;

e) prior to said motor vehicle's entry into said intersection, engaging a switch in an operator's compartment coupled to said controller to activate said controller such that said flashing no turn warning is projected forward toward said oncoming person to indicate that said motor vehicle is proceeding through said intersection rather than turning either to the right or to the left; and f) evidencing, via an indicator, to an occupant of said operator's compartment said no turn warning is flashing.

16. The method of claim 15 further comprising the steps of:

a) mounting a third visible light at one of said other locations not previously having said first or said second visible light mounted thereon; and b) linking said third visible light to said controller.

17. The method of claim 16 wherein said controller serially energizes said first, said second and said third visible lights.

18. The method of claim 16 wherein said controller sequentially energizes said first, said second and said third visible lights.

19. The method of claim 16 wherein said controller concurrently energizes said first, said second and said third visible lights.

20. The method of claim 17 wherein either said first, said second or said third visible light of said no turn warning is projected at said oncoming person in arrow-like appearance.

* * * * *